United States Patent [19]
Myers

[11] Patent Number: 5,594,667
[45] Date of Patent: Jan. 14, 1997

[54] METHOD AND APPARATUS FOR BASELINE DRIFT CORRECTION FOR A SENSOR

[76] Inventor: Allen Myers, R.R. 2, Ames, Iowa 50010

[21] Appl. No.: 911,775

[22] Filed: Jul. 10, 1992

[51] Int. Cl.$^6$ .............................. G01F 1/76; G01D 1/02; G01L 1/22
[52] U.S. Cl. ................... 364/571.01; 364/571.02
[58] Field of Search ................... 364/571.01, 571.02, 364/571.03, 571.04, 571.05, 571.06; 73/861.73, 3; 324/309

[56] References Cited

U.S. PATENT DOCUMENTS

| | | | |
|---|---|---|---|
| 4,616,183 | 10/1986 | Glover et al. | 324/309 |
| 4,884,440 | 12/1989 | Berthel | 364/571.03 |
| 5,065,632 | 11/1991 | Reuter | 73/861.73 |

OTHER PUBLICATIONS

Bertolaccini et al. "A Precision Baseline Offset and Drift Corrector for Low–Frequency Applications" IEEE Transactions on Instrumentation and Mesurement, vol. IM–34, No. 3, Sep. 1985, pp. 405–412.

*Primary Examiner*—Emanuel T. Voeltz
*Assistant Examiner*—M. Kemper
*Attorney, Agent, or Firm*—Kent A. Herink, Esq.; Brian J. Laurenzo, Esq.; Davis, Brown et al.

[57] ABSTRACT

A method for continuously correcting for the baseline drift of a sensor which measures a cyclically varying parameter. The output signal of the sensor is sampled rapidly over an integer number of cycles of the measured parameter. The sampled values of the output signal are stored as a data set in a memory circuit for subsequent analysis by a computing circuit to determine the actual baseline level of the sensor, which drifts at a rate relatively slowly in comparison to the time interval during which the data set was collected. In one embodiment of the invention, baseline level is calculated as the average of a fixed percentage of the points in the data set which have the lowest values found in the data set. In another embodiment, a data mask with multiple selection segments spaced at time intervals equal to the period of the cyclically varying measured parameter is used to determine those points from the data set which are averaged to calculate the baseline level. The data mask is placed at multiple positions on the data set, and the lowest calculated baseline level is chosen as best representing the actual baseline level of the sensor. This method is particularly useful for continually determining the baseline level of a grain mass flow rate sensor which is used in a harvester. The baseline level of this type of sensor drifts significantly due to varying thermal, mechanical and operating conditions. Correction for this drift by continually recalculating the baseline level allows accurate measurement of grain mass flow rate at all times.

6 Claims, 5 Drawing Sheets

METHOD AND APPARATUS FOR BASELINE DRIFT CORRECTION FOR A SENSOR

FIELD OF THE INVENTION

The present invention relates to methods for continuously correcting for baseline drift in the output signal of a measuring device. More specifically, the present invention relates to methods for correcting for baseline drift of a sensor which measures a cyclically varying quantity. More specifically, the present invention relates to means and methods for correcting for baseline drift of an impact type mass flow sensor which is used for continuously measuring grain mass flow rate in a harvester as grain is harvested.

BACKGROUND OF THE INVENTION

Methods for measuring instantaneous crop yield as a grain harvester is moving through a field of grain have been the subject of prior inventions. Methods for measuring the mass flow rate of grain in a harvester have been used to provide a grain flow rate signal which can be used to calculate either the total weight of grain harvested within a given field area or the instantaneous yield of the crop at the present location of the harvester in the field. These data are useful to the agricultural producer to allow measuring the effect of different soil conditions or crop growing practices on crop yield. Total weight of grain is calculated by integrating grain mass flow rate versus time. Instantaneous crop yield is calculated by dividing instantaneous grain mass flow rate by the instantaneous rate at which the harvester is harvesting the field area.

Numerous methods have been used to measure mass flow rate of grain on harvesters. U.S. patent application Ser. No. 07/716,293, now U.S. Pat. No. 5,343,761, discloses means and methods for measuring grain mass flow rate at the exit of a paddle type chain conveyor, by measuring the force resulting from grain striking an impact plate as grain exits the conveyor. Other methods, such as measuring electrical properties, such as capacitance, of grain passing by or contacting a means for sensing said properties, have also been used.

All of the known means for measuring mass flow rate use a sensor which provides an electrical output signal which varies in a linear or non-linear relationship with mass flow rate. Accurate calculation of mass flow rate from this signal requires that the value of this signal be accurately known at both the mass flow rate to be measured and at a baseline condition of zero mass flow rate. The difference in the output signal of the sensor between these two conditions can be used in combination with a calibration characteristic to estimate actual mass flow rate. With many of the known sensors and their associated electronic signal conditioning, changes in the baseline output signal occur due to many causes; such as drift in electronic signal conditioning, thermal or mechanically induced stresses in the sensor means, and variation in baseline sensor output at zero mass flow rate due to unwanted but unavoidable changes in operating conditions. An example of the latter type of real but unwanted sensor signal is a change in the baseline output signal of an impact force measuring sensor, as shown in said application, due to varying inclination of a harvester as it operates within a crop field with varying ground slope.

Slow changes in the baseline output signal of a sensor at zero level of the measured parameter is often termed zero or baseline drift, and is a widely recognized problem with many types of sensors. The usual method for minimizing errors caused by baseline drift is to build the sensor and associated signal conditioning with very high accuracy, so that most of the causes of drift are minimized in magnitude. This is usually costly, and in some cases, impossible to do at any cost.

Another approach to minimizing errors caused by baseline drift is to use a method for cancelling or correcting for drift by periodically measuring the output signal of the sensor when the measured parameter is known to be at a zero level. U.S. Pat. Nos. 3,714,806 and 3,791,204 show methods for holding the output signal of force indicating means on steel rolling machines at zero when no steel is passing between the rollers of the machines, which is a known condition of zero rolling force. This method functions well for a steel rolling application, because rolling force is the only significant force which can be applied to the force sensor, and essentially all other changes in indicated force are due to baseline drift. However, this method does not function well for an impact type grain mass flow sensor in a harvester, because variation in operating slope of the harvester can cause continual variation in the baseline output signal of the flow sensor, due to the weight of the sensing mechanism, while the sensor operates continuously at a non-zero mass flow rate condition. A zero mass flow rate condition does not exist with sufficient frequency to allow this method to be used successfully on a harvester.

U.S. Pat. Nos. 3,434,062 and 3,359,410 show methods of correcting for baseline drift of the output signal of a chromatograph. These methods utilize the fact that the output signal characteristic of a chromatograph consists of a slowly drifting baseline value which is periodically interrupted by sharp peaks representing the quantities being measured. Baseline drift correction is applied when the output signal is changing slowly, but is stopped when the signal is changing rapidly. This method of drift correction does not function well for an impact type grain mass flow sensor in a harvester, because the slopes of the baseline and the useful output signals from an impact sensor are not as clearly differentiated as with a chromatograph. For example, significant peaks and valleys may exist in the baseline signal due to mechanical vibration of the impact sensor due to operation of the harvester.

SUMMARY OF THE INVENTION

An object of the present invention is to provide a new and novel method of correcting for baseline drift of a sensor.

Another object of the present invention is to provide a method for continuously correcting for the baseline drift of a sensor which measures a cyclically varying parameter which does not return to a stabilized zero value for a significant period of time.

A further object of the present invention is to provide a method of continuously correcting for the baseline drift of an impact type mass flow rate sensor which measures cyclical impact forces which occur at a relatively constant frequency.

A further object of the present invention is to provide a method of continuously correcting for the baseline drift of a grain mass flow rate sensor in a harvester.

The foregoing objects of the present invention are provided by a system including a grain mass flow rate sensor which utilizes the linear momentum imparted to grain by the clean grain elevator of a harvester as grain exits said elevator. A vertical impact plate is mounted in the path of grain exiting said elevator. The impact plate stops the horizontal motion of grain striking it, thus changing the linear momentum of the grain and causing a reaction force to be exerted on the impact plate which is generally proportional to grain mass flow rate. This impact force is measured and is used in combination with a flow calibration characteristic, which relates grain mass flow rate to average impact force, to calculate grain mass flow rate. The impact plate is mounted on a load beam, on which strain gauges are mounted to provide electrical measurement of the force exerted on the impact plate by grain.

Electronic means continuously amplifies and filters the output of the strain gauges. This amplified signal, which varies directly with force on the impact plate, is continuously sampled at small time intervals, such as 0.001 second, and the sampled values are stored in their original time sequence in a memory device. Computing means averages the sampled values over a finite time period, termed the recording period, which is typically in the range of 1 to 2 seconds. The baseline value of the amplified signal is subtracted from the average value of said signal to provide a net value which is directly proportional to impact force. This net value is multiplied by a force calibration factor, which has been pre-determined for the particular load beam and signal conditioning circuit, to provide the actual value of average impact force. Electronic computing means provides conversion of average impact force measured by the load beam into grain mass flow rate based on a flow calibration characteristic for the particular clean grain elevator and impact plate configuration.

Since the force exerted by grain on the impact plate repeatedly rises and falls as the paddles of the dean grain elevator chain discharge their individual quantities of grain against the impact plate, the amplified force signal is averaged over a time period corresponding to an integer number of time periods between the passing of paddles of the dean grain elevator chain, to ensure that the resulting average value accurately represents average impact force. The time period between passing of successive paddles of the dean grain elevator chain is calculated from the actual measured operating speed of the clean grain elevator.

For each recording period over which the amplified force signal is averaged, a value representative of the baseline value is determined by averaging portions of the amplified signal which are representative of its value at zero impact force. This method allows a new baseline value to be determined for each recording period.

In one embodiment of the invention, the portions of the amplified signal which are used as representative of the baseline value are simply a fixed percentage of the total number of points recorded during the recording period which have the lowest values recorded over said period.

In another embodiment of the invention, the portions of the amplified signal which are used as representative of the baseline value are also a fixed percentage of the total number of points recorded during the recording period, but the points used to determine the baseline value are determined in a manner such that they consist of groups of points spaced at time intervals corresponding to the paddle frequency of the clean grain elevator.

These and other objects and advantages of the present invention, as well as details of illustrative embodiments, will be more fully understood from the drawings and the detailed description of the invention.

DETAILED DESCRIPTION OF THE INVENTION

The present invention is particularly useful when used with the means and methods disclosed in U.S. patent application 07/716,293, now U.S. Pat. No. 5,343,761, and the disclosure of said application is included herein by reference.

Figure 1:
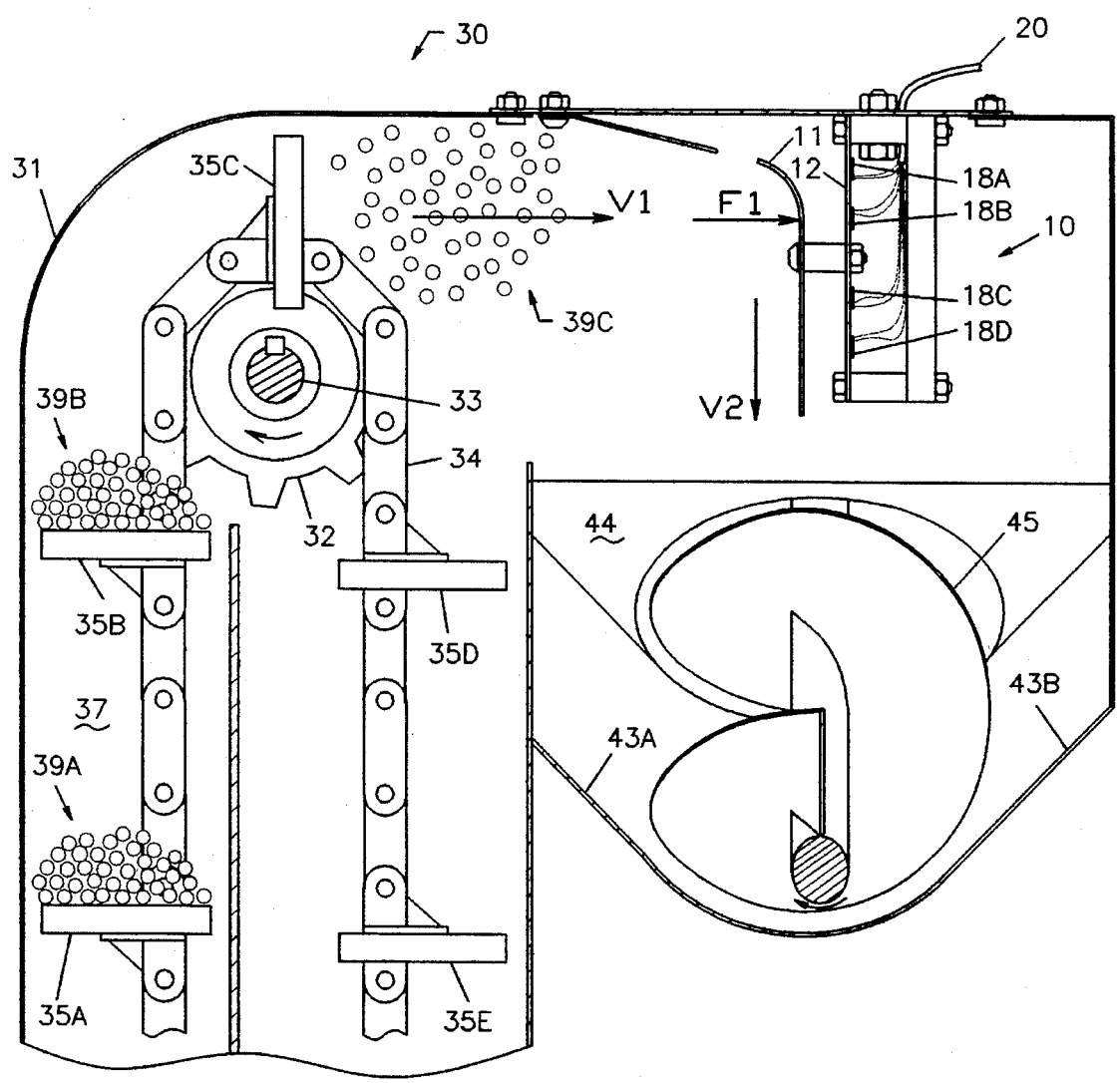
FIG. 1 is a vertical cross section through the upper or outlet end of the clean grain elevator of a typical harvester, with a grain mass flow rate sensor installed in a grain collection area near the outlet of the elevator.

Referring first to FIG. 1, a grain mass flow rate sensor, generally designated at 10, is positioned at the outlet of a clean grain elevator, generally designated at 30, of a harvester. Clean grain elevator 30 includes an elevator housing 31 and a chain sprocket 32 which rotates with a shaft 33 to drive a conveyor paddle chain 34, which wraps around the sprocket 32 and to which are attached paddles 35A–35E for lifting grain from the inlet or lower end of the clean grain elevator 30 to the outlet or upper end of the clean grain elevator 30. Sprocket 32 rotates clockwise as viewed, causing paddles 35A–35E to lift quantities of grain such as 39A and 39B upward within a compartment 37. When a link of the chain 34 to which a paddle such as 35C is connected contacts sprocket 32, the chain link and attached paddle travel in a circular arc about shaft 33, imparting generally horizontal motion to a quantity of grain such as 39C, causing grain to exit clean grain elevator 30 into a collection area 44. Collection area 44 includes sloped lower surfaces 43A and 43B which cause grain to collect around a grain storage tank loading auger 45, which is a screw type auger for conveying grain from collection area 44 into the grain storage tank (not shown) of the harvester.

Grain mass flow rate sensor 10 includes an impact plate 11 which is attached to load beam 12, to which four strain gauges 18A–18D are bonded. Cable 20 contains eight electrical conductors which connect said strain gauges to remote signal conditioning circuitry (FIG. 2).

A quantity of grain such as 39C initially travels with generally horizontal velocity V1 toward impact plate 11. Upon striking impact plate 11, the horizontal motion of quantity of grain 39C is stopped and the grain subsequently falls into collection area 44 with final velocity V2, which is generally vertical. The change in the horizontal component of velocity of quantity of grain 39C from V1 to substantially zero corresponds to a change in horizontal momentum of this quantity of grain which is proportional to both the mass of quantity of grain 39C and initial velocity V1. A force F1, which is proportional to the change in momentum of quantity of grain 39C, is created on impact plate 11 and is measured by load beam 12.

Figure 2:
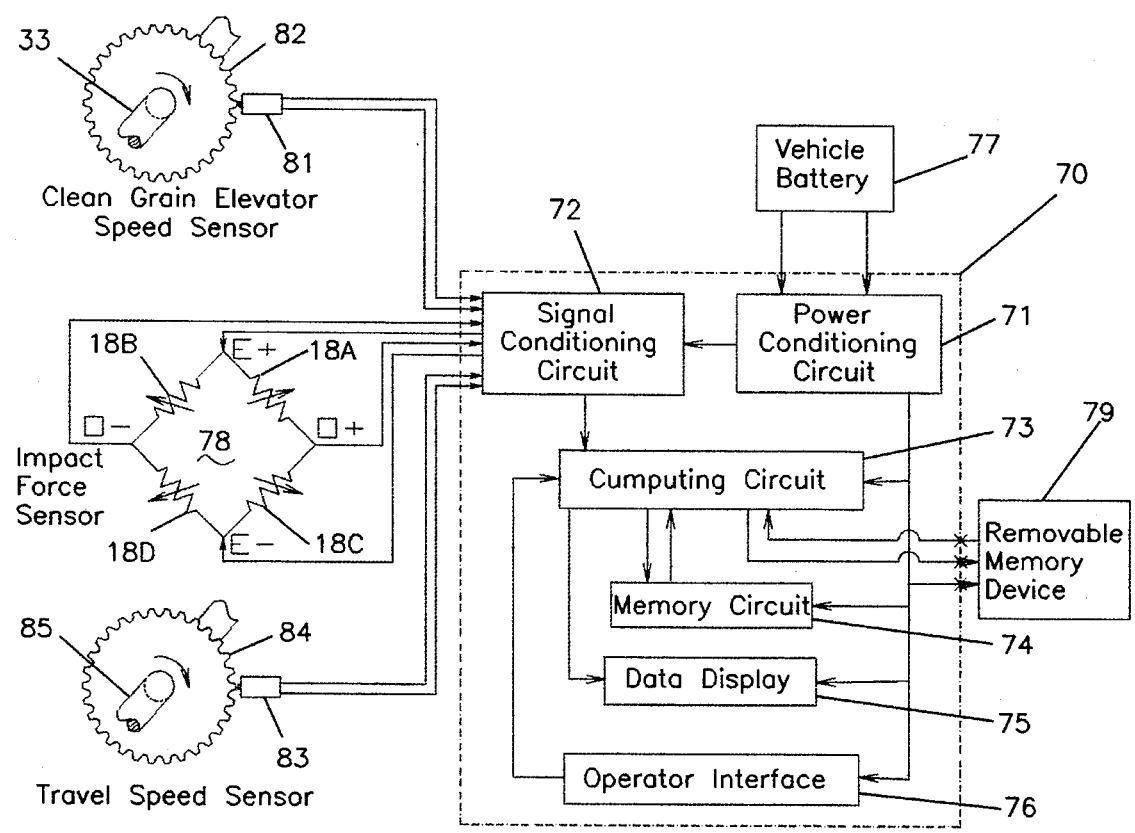
FIG. 2 is a schematic diagram of a complete system for measuring grain mass flow rate, harvester travel speed and clean grain elevator speed; and for computing, storing and displaying the measured values or other useful data which are computed from said values.

Referring now to FIG. 2, a diagram of a complete grain mass flow measuring system of the present invention is illustrated. An electronic monitor, generally indicated as 70, includes a power conditioning circuit 71, a signal conditioning circuit 72, a computing circuit 73, a memory circuit 74, a data display 75 and an operator interface 76. Signal conditioning circuit 72 includes excitation and sensing means for a strain gauge bridge 78 and a pair of shaft speed sensors 81 and 83. Strain gauges 18A–18D of FIG. 1 are shown schematically in FIG. 2. The system of FIG. 2 also includes a pair of toothed wheels 82 and 84, which are used in cooperation with the corresponding speed sensors 81 and 83 to measure the actual speeds of the clean grain elevator shaft 33 and of the shaft 85 which rotates at a speed proportional to travel speed of the harvester.

Power conditioning circuit 71 is supplied with electrical power from the electrical system battery 77 of the harvester. This power conditioning circuit protects the remaining circuitry of dectronic monitor 70 from harmful transients and supplies one or more regulated constant voltages which are required by the other circuits.

Strain gauge bridge 78 is energized by a constant voltage differential, E+ minus E–, which is supplied from signal conditioning circuit 72. The arrangement of the strain gauges in bridge 78 is such that the output differential voltage, O+ minus O–, is proportional only to forces perpendicular to the load beam. Signal conditioning circuit 72 amplifies and filters the output differential voltage of bridge 78 and provides a conditioned signal to computing circuit 73.

Signal conditioning circuit 72 amplifies bridge output voltage O+ minus O–, which is very small, in the range of 5 millivolts maximum, to a level which is accurately measurable by computing circuit 73. Circuit 72 also filters out unwanted high frequency noise from the amplified signal.

Signal conditioning circuit 72 also filters and amplifies signals from the pulse type speed sensors 81 and 83 which are used to provide alternating voltage signals with frequencies proportional to the speeds of rotation of the respective shafts 33 and 85. Toothed wheels 82 and 84 have multiple protruding teeth which generate alternating voltages in a corresponding one of the speed sensors 81 and 83 as these teeth pass by the speed sensors. Toothed wheel 84 can be mounted directly on a wheel of the harvester or it can be mounted on a shaft in the driving means for the drive wheels of the harvester. It is also possible to eliminate toothed wheel 84 and speed sensor 83 by using alternate means for measuring harvester travel speed, such as a radar speed sensor which directly measures the speed of the harvester structure relative to the surface of the field. It is also possible to eliminate toothed wheel 82 and speed sensor 81 by calculating clean grain elevator speed from the impact force signal measured by the load beam, as is described in the referenced application.

Computing circuit 73 is implemented with digital electronics due to the superior computational capabilities of digital computing devices such as micro-processors. Computing circuit 73 calculates useful data based on the signals received from signal conditioning circuit 72. This data can be stored in memory circuit 74 for later retrieval, and can be displayed immediately to the harvester operator on data display 75.

Operator interface 76 includes manually operable devices such as switches which allow the harvester operator to perform functions such as selecting the type of data to be displayed on data display 75, entering calibration parameters, and managing the data stored in memory circuit 74.

A removable memory device 79 can be removed from monitor 70, which is mounted on the harvester, and transported to a remote location for reading yield and area data which is stored on the memory device.

Figure 3A:
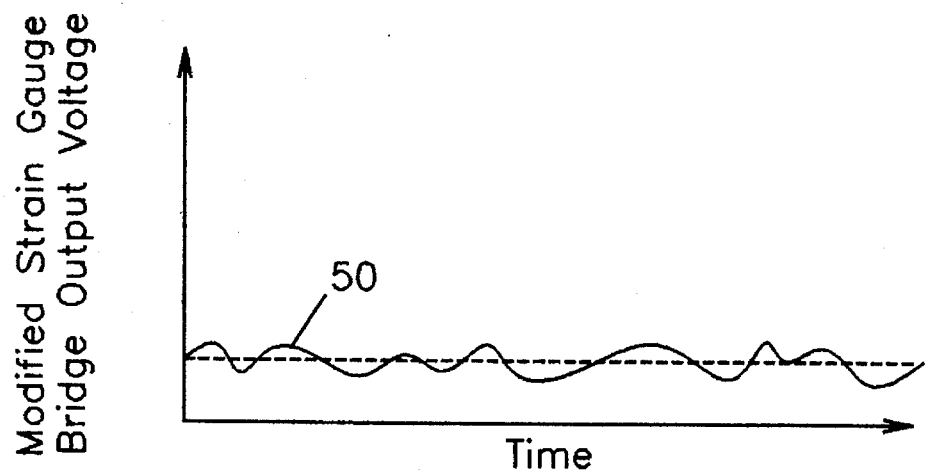
FIGS. 3A–3B are graphical representations of typical amplified electrical signals which are representative of the impact force exerted on the load beam of the grain mass flow rate sensor of FIG. 1.
Figure 3B:
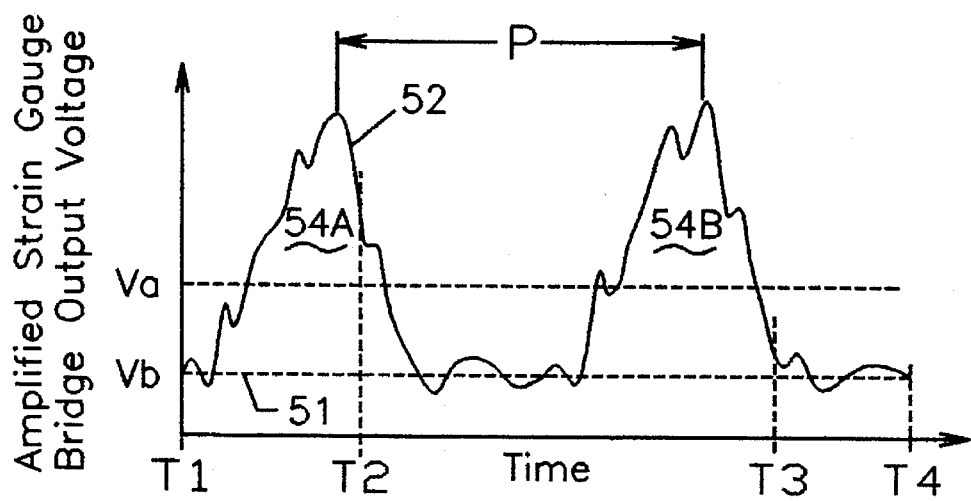

Referring now to FIGS. 3A and 3B, the prior art method of measuring force F1 on impact plate 11 by utilizing the signal obtained from the four arm bridge comprising strain gauges 18A–18D is described. FIG. 3A illustrates amplified strain gauge bridge output voltage 50, obtained from the signal conditioning circuit of FIG. 2, versus time when the clean grain elevator is operating with no grain flow. Output voltage 50 is not steady, but oscillates due to vibration induced by operation of the harvester. However, since there is no grain flow, it is known that the average value of force F1 due to grain striking impact plate 11 is zero. Therefore, average baseline voltage Vb, which is the average value of output voltage 50, corresponds to the zero level of force Fl. The computing circuit of FIG. 2 averages output voltage 50 over a time interval of at least one second when there is no grain flow from the clean grain elevator, to allow determination of baseline voltage Vb, the value of which is stored in the associated memory circuit for use in calculating the average value of force F1 when the clean grain elevator is conveying grain.

FIG. 3B illustrates output voltage 52 obtained when the clean grain elevator is conveying grain. Pulses such as 54A and 54B occur periodically in output voltage 52 when individual quantities of grain strike the impact plate. The period P of the pulses in bridge output voltage 52 is determined by the speed and the paddle spacing of the clean grain elevator chain of the particular harvester, and is typically in the range of 0.06 to 0.10 second. The computing circuit of FIG. 2 averages output voltage 52 over a finite time interval, such as 1 second, to obtain average output voltage Va. Since average baseline voltage Vb corresponds to zero force F1 on the impact plate, the average value of force F1 is proportional to the difference between average output voltage Va and baseline voltage Vb. The proportionality between changes in force F1 and changes in output voltage 52 is a constant scale factor for the particular load beam and electronic circuit, which is determined prior to installation of the grain mass flow rate sensor in the harvester by calibrating the load beam with a known force. The computing circuit of FIG. 2 multiplies the difference between average output voltage Va and baseline voltage Vb by said scale factor to obtain the average value of force F1.

The value obtained for average output voltage Va is dependent on the duration of the time interval over which output voltage 52 is averaged. Time interval T1–T4 is equal to twice the time period P between passage of successive paddles of the clean grain elevator chain. Averaging output voltage 52 over time interval T1–T4 provides the correct value for average output voltage Va. However, it is readily seen that averaging output voltage 52 over time period T1–T3, which is not an integer multiple of time period P, will produce a higher value of average output voltage Va, because the portion of output voltage 52 omitted during time period T3–T4 is less than average output voltage Va. Conversely, averaging output voltage 52 over time period T2–T4 will produce a lower value of average output voltage Va. To provide maximum accuracy of measuring the average value of force F1 while limiting the time interval over which output voltage 52 is averaged to obtain average output voltage Va, output voltage 52 is averaged over a time period equal to an integer number multiplied by time period P. The actual value of time period P is calculated from the measured actual speed of the clean grain elevator chain. Of course the number of time periods P used for averaging bridge output voltage 52 can be any integer number and is not limited to the value of two used for illustration in FIG. 3B.

Figure 4:
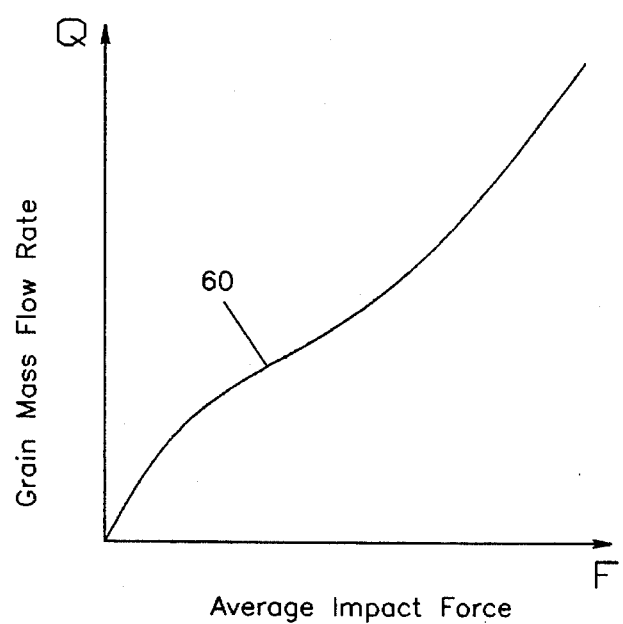
FIG. 4 is a graphical representation of a typical flow calibration characteristic which relates grain mass flow rate to average impact force exerted by grain on the impact plate of the grain mass flow rate sensor of FIG. 1.

FIG. 4 illustrates a typical flow calibration characteristic for the grain mass flow rate sensor 10 of FIG. 1. Characteristic curve 60 relates average grain mass flow rate to the average impact force exerted by grain on the impact plate. The computing circuit of FIG. 2 uses characteristic curve 60 in conjunction with the computed average impact force to calculate an estimated value of actual grain mass flow rate. For example, for a calculated impact force of Fn, grain mass flow rate is estimated to be Qn.

Flow calibration characteristic curve 60 is determined experimentally by measuring average impact force F versus grain mass flow rate Q for a particular clean grain elevator and impact plate configuration. For maximum accuracy of mass flow rate measurement, different flow calibration characteristic curves are obtained for different grain types and different grain moisture contents. These flow calibration characteristics are each stored in the memory circuit, and the appropriate characteristic is selected based on grain type and moisture content.

An improved method of determining the baseline output for a sensor which measures a cyclical parameter is described with reference to FIG. 5. Four grain impact pulses 56A–56D are shown in a graphical representation of output voltage 52, which is shown as a series of dots to indicate the small time intervals at which said voltage is sampled and stored by the computing and memory circuits of FIG. 2. Time period P represents the period of the grain impact pulses, which is determined by the speed and paddle spacing of the clean grain elevator chain, while time period R represents a recording period over which output voltage 52 is recorded for subsequent analysis. Time period R is an integer number of time periods P, where P is determined based on the actual operating speed of the clean grain elevator. Recording period R is shown as a multiple of four times period P in FIG. 5 for purposes of illustration only, and any integer multiplier may be used. Using larger multipliers increases the number of data points available for determining average output and average baseline values, and thereby increases accuracy, but it also increases both computation time and the time interval between the availability of estimated mass flow rate values.

Time periods B1–B4 represent those portions of time where output voltage 52 is representative of the baseline voltage that exists with zero mass flow rate. The output voltage existing within these time periods oscillates about the actual baseline voltage, due to vibrations of the harvester which are transmitted to the impact plate through the load beam, causing oscillatory loading of the load beam. The voltage oscillations due to harvester vibration can be reduced by heavier filtering of output voltage 52. However, such filtering also reduces the ability of the output voltage to drop to the baseline value before the next grain impact pulse arrives. Averaging the values of output voltage 52 recorded within time periods B1–B4 produces an average value for baseline voltage which is closely representative of the actual baseline voltage existing at the time the data points in FIG. 5 are recorded.

A method to select the points falling within time periods B1–B4 is needed to select these points from the total sequence of points recorded within recording period R. A simple method of selection is to select a fixed percentage, which is typically in the range of 20% to 40%, of the total number of points recorded in period R which have the lowest values recorded in said period. Averaging the values of the points selected by this method provides an estimated value for baseline voltage. Application of this method to the points in FIG. 5, using 30% of the points with the lowest values, results in selection of all points below a value of V1, and averaging of these points produces an estimated baseline value of Vb. However, the value of Vb determined by this method is not as accurate as it could be, because some points within baseline periods B1–B4 are above a value of V1, such as at 57, and are thus not used for determining Vb, while other points outside of baseline periods B1–B4 are below a value of V1, such as at 58, and are used for determining Vb. This results in a value of Vb which is slightly less than the true baseline value, because too many points near the bottom of the vibration oscillations, such as at 58, are included, while some points near the top of the vibration oscillations, such as at 57, are not included.

The above described error in estimating baseline voltage increases as grain mass flow rate decreases, because the width and height of the grain impact pulses, such as 56A–56D, decrease with reduced grain flow, resulting in longer durations of baseline time intervals B1–B4. As time intervals B1–B4 become a larger percentage of recording period R, the method of selecting a fixed percentage of the points within period R which have the lowest values selects even more points near the bottom of the oscillations and fewer points near the top of the oscillations, further increasing the error in estimating baseline voltage. This occurs because a smaller portion of the points within the baseline periods are selected, allowing a higher portion of the selected points to be near the bottom of the oscillations.

Figure 5:
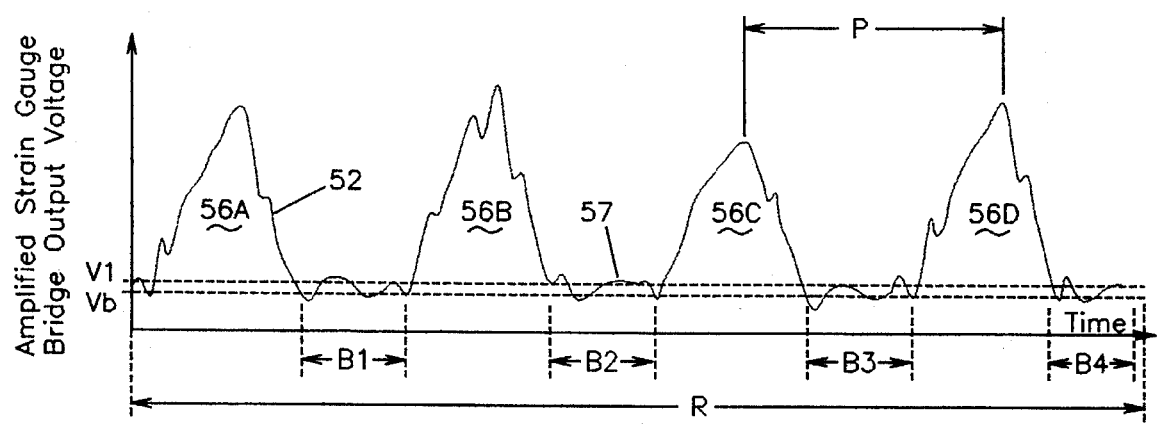
FIG. 5 is a graphical representation of the amplified electrical signal which is representative of the impact force exerted on the mass flow rate sensor of FIG. 1, illustrating a first method of estimating the baseline value of said signal.
Figure 6A:
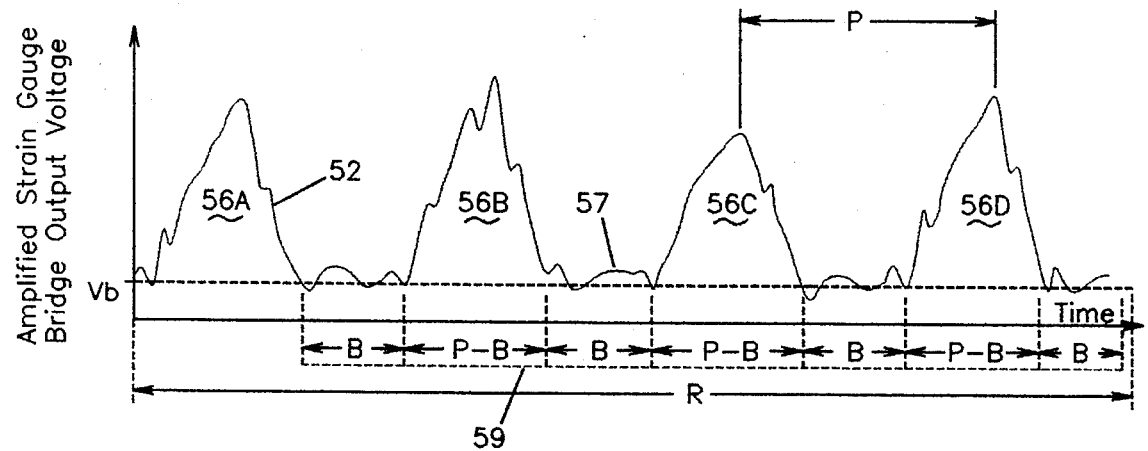
FIGS. 6A–6C are graphical representations of the amplified electrical signal which is representative of the impact force exerted on the mass flow rate sensor of FIG. 1, illustrating a second method of estimating the baseline value of said signal.
Figure 6B:
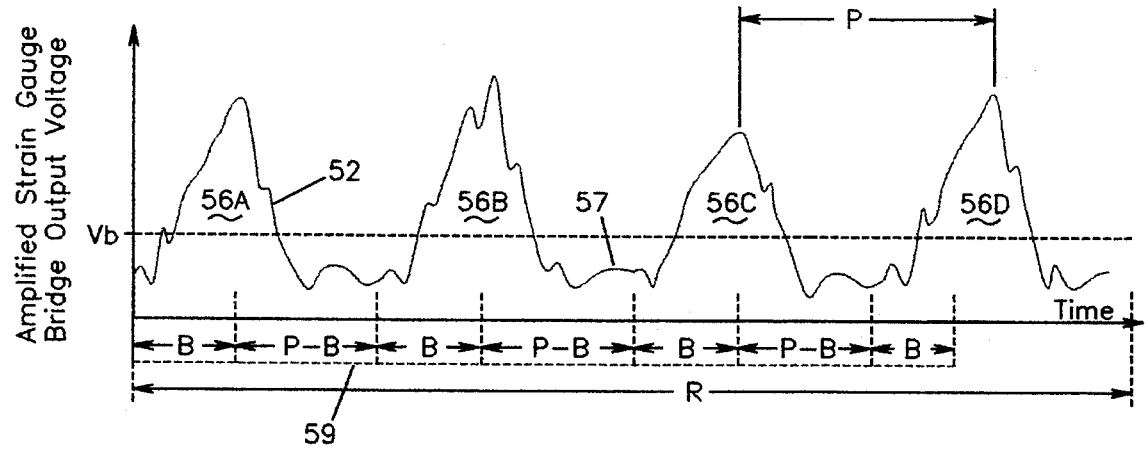
Figure 6C:
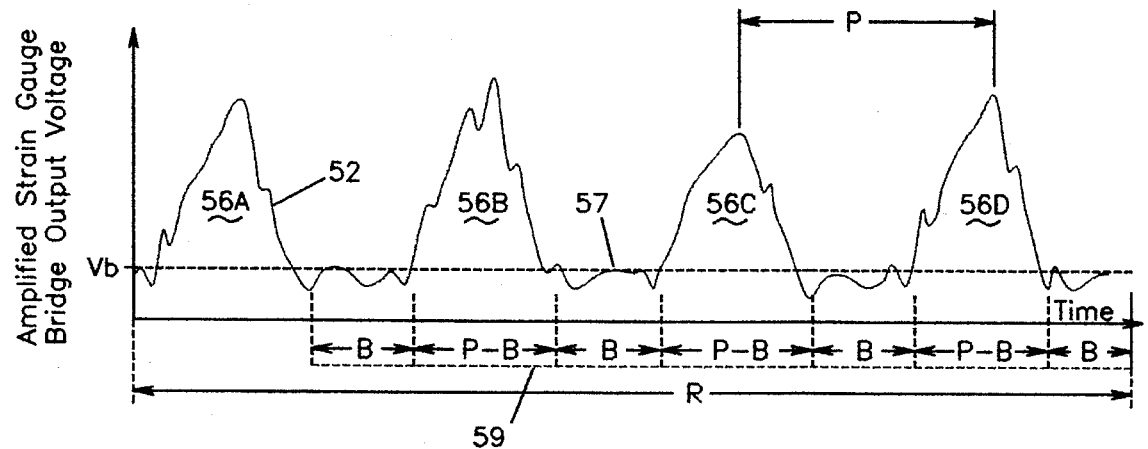

An improved method of selecting the output voltage points used for determining baseline voltage Vb is now described with reference to FIGS. 6A–6C, which show the same sampled output voltage waveform 52 as shown in FIG. 5. A data mask 59 consists of four baseline periods B, which are separated by time periods P minus B, so that time periods B are spaced at time intervals equal to paddle period P. The duration of time periods B is established as a fixed percentage of paddle period P which represents approximately the minimum duration of time periods B when the clean grain elevator is carrying the maximum expected grain flow rate. This value is typically in the range of 20% to 40% of paddle period P. When properly positioned within recording period R, time periods B will correspond to time periods B1–B4 in FIG. 5, as shown in FIG. 6A, allowing selection of the data points falling within periods B, for averaging to obtain an accurate value of baseline voltage Vb.

One method of positioning data mask 59 within recording period R is to time the start of recording period R so that it aligns with either the start of a grain impact pulse period P minus B or with the start of a baseline period B. Conversely, recording period R can be timed arbitrarily, and logic such as used with the referenced patents relating to chromatographs can be used to determine the start or end of either the grain impact or baseline periods. However, these methods have limited accuracy due to the noisy nature of the mass flow rate sensor signal, which makes determination of the start and end points of said periods inaccurate.

A further improved method of positioning data mask 59 is to position it at multiple positions within recording period R, compute a test value of the average baseline voltage for each position of the mask and select the best position based on a parameter which indicates the best positioning of the data mask. FIG. 6B shows a possible first position of the data mask, with the start of the mask aligned with the start of the recording period R. Calculation of average baseline voltage Vb with this mask position will result in the high value of Vb shown, which is not representative of the true baseline voltage. After calculating Vb with the mask in this position and recording this value of Vb in the memory circuit of FIG. 2, the mask is next moved rightward by one or more data points and a new value of Vb is calculated. If, and only if, the new value of Vb is less than the originally stored value, the new value is used to replace the original value. This process of moving the mask rightward and recalculating is repeated until the mask is positioned as shown in FIG. 6C, where the end of the data mask aligns with the end of the recording period R. At this mask position, the calculated value of Vb is slightly greater than that determined in FIG. 6A because baseline periods B include some of the rising edges of grain impact pulses 56A–56D. The process of repeatedly moving the mask and recalculating results in the final value of Vb which is stored in memory being the lowest value which was calculated for Vb, which will be equal or very close to the value that is calculated with the mask in the position shown in FIG. 6A. Mask positions substantially to the left or to the right of the position shown in FIG. 6A will result in values of Vb which are greater than that determined with the mask positioning of FIG. 6A, and will thus not produce the lowest value of Vb. Choosing the lowest value of Vb determined by this method provides an accurate determination of baseline voltage because it ensures selection of a Vb value corresponding to a data mask position with time periods B placed between the grain impact pulses.

To ensure accurate determination of baseline voltage Vb, the duration of time periods B must be chosen so that it is neither too small nor too large. If the duration of periods B is too small, such as 5% of period P, the lowest value of Vb will usually represent a mask position with time periods B aligned with the bottom of the oscillations in output voltage 52, producing an erroneously low value of Vb. If the duration of periods B is too large, such as 60% of period P, portions of the grain impact pulses will be included in periods P, producing an erroneously high value of Vb. Experience has shown that a duration of periods B equal to 20% to 40% of period P produces accurate calculation of baseline voltage with typical clean grain elevators which are currently used on harvesters.

It should also be recognized that the present invention is useful with any type of sensor which measures a cyclically varying parameter. The present invention can also be used with a sensor where the baseline level is a high voltage and the output voltage of the sensor is reduced as the measured parameter increases. Further, the present invention can be used with sensors which do not produce a DC voltage output, but produce outputs of DC current, AC voltage or current, frequency, sound intensity or light intensity. The only limitation on the type of usable sensor output is that it must be measurable by use of signal conditioning and computing circuits.

The foregoing description of the preferred embodiments of the present invention has been presented to illustrate the best mode of implementing the subject invention. It is not intended to be exhaustive nor to limit the invention to the precise form disclosed. Other embodiments are possible without departing from the scope of the invention, and it is intended that the scope of the invention be limited only by the claims appended hereto.

I claim:

1. Apparatus for measuring mass flow rate of grain exiting a power driven conveying means that discharges grain at a substantially constant cycle period in a harvester, comprising:

an impact plate positioned to be impacted by grain exiting said conveying means;

force measuring means for generating an electrical signal proportional to the impact force exerted on said impact plate by said grain;

computing means in electrical communication with said force measuring means for generating a data mask for analyzing at least a portion of a finite time record of said electrical signal, said data mask having a duration that is an integral multiple of said cycle period;

wherein said computing means uses at least one position of said data mask relative to said finite time record to establish a value representative of the baseline value of said force; and wherein said computing means calculates grain mass flow rate by using said baseline value in calculations to determine an average impact force and by utilizing a mass flow calibration characteristic which relates said grain mass flow rate to said average impact force.

2. The apparatus of claim 1, wherein a test value of the baseline value is established at each of a progression of positions of said data mask and the position of the data mask which provides the lowest of said test values is selected for establishment of the baseline value.

3. Apparatus for establishing a value representing the baseline value electrical signal of a sensor which is representative of the measurement of a cyclically varying parameter having a substantially constant cycle period, comprising:

means for measuring the output electrical signal representative of the parameter over a finite time period;

computing means in electrical communication with said measuring means for generating a data mask for analyzing at least a portion of a record of said finite time period of said electrical signal, said data mask having a duration that is an integral multiple of the cycle period;

means for dividing said finite time period into an integral number of second time periods each of which is equal to said cycle period and dividing each of said second time periods into at least one data collection interval and at least one baseline interval of a predetermined length; and wherein said computing means establishes a test value of the baseline output at each of a progression of positions of said data mask and selects the position of said data mask which provides the lowest of said test values for establishment of the baseline value.

4. A method for establishing in electrical circuitry a value representing a baseline output of a sensor which generates an output electrical signal representative of the measurement of a cyclically varying parameter having a substantially constant cycle period, comprising the steps of:

measuring the output electrical signal representative of the parameter over a finite time period;

generating a data mask for analyzing at least a portion of a record of said finite time period of said electrical signal, said data mask having a duration that is an integral multiple of the cycle period;

dividing said finite time period into an integral number of second time periods each of which is equal to said cycle period;

dividing each of said second time periods into at least one data collection interval and at least one baseline interval of a predetermined duration: and establishing a progression of test values of the baseline output at a first position and a plurality of progressively shifted subsequent positions of said data mask and selecting the position of said data mask which provides the lowest test values of the baseline output.

5. Apparatus for measuring a cyclically varying parameter of harvested material having a substantially constant cycle period in a harvester, comprising:

measuring means for generating an electrical signal proportional to the parameter:

computing means in electrical communication with said measuring means for generating a data mask for analyzing at least a portion of a finite time record of said electrical signal, said data mask having a duration that is an integral multiple of said cycle period;

wherein said computing means uses at least one position of said data mask relative to said finite time record to establish a value representative of the baseline value of the parameter; and wherein said computing means calculates an average value of the parameter by using said baseline value in calculations to determine an average value of said electrical signal and by utilizing a calibration characteristic which relates said average value of the parameter to said average value of said electrical signal.

6. The apparatus of claim 3, wherein:

the parameter includes mass flow rate of grain exiting a power driven conveying means that discharges grain at a substantially constant cycle period;

said measuring means includes means for measuring an impact force generated by the grain;

said average value of the parameter includes grain mass flow rate; and said calibration characteristic includes a mass flow calibration characteristic.

* * * * *